(12) United States Patent
Brong et al.

(10) Patent No.: US 6,563,670 B2
(45) Date of Patent: May 13, 2003

(54) DATA STORAGE TAPE CARTRIDGE WITH GUIDE HAVING WEAR PATTERN

(75) Inventors: Brian D. Brong, Oakdale, MN (US); Christopher J. Zwettler, Lake Elmo, MN (US)

(73) Assignee: Imation Corp., Oakdale, MN (US)

(*) Notice: Subject to any disclaimer, the term of this patent is extended or adjusted under 35 U.S.C. 154(b) by 185 days.

(21) Appl. No.: 09/729,560

(22) Filed: Dec. 4, 2000

(65) Prior Publication Data

US 2002/0067573 A1 Jun. 6, 2002

(51) Int. Cl.[7] .................................. G11B 23/087

(52) U.S. Cl. ............. 360/132; 360/130.21; 360/130.33; 242/346

(58) Field of Search .................. 360/132, 130.21, 360/130.31, 130.33; 242/346

(56) References Cited

U.S. PATENT DOCUMENTS

| 4,534,523 | A |   | 8/1985 | Zarr |
| 5,104,058 | A |   | 4/1992 | Eggebeen |
| 5,326,044 | A |   | 7/1994 | Haller |
| 5,377,927 | A |   | 1/1995 | Erickson et al. |
| 5,772,143 | A | * | 6/1998 | Runyon et al. ............. 242/346 |
| 5,860,612 | A | * | 1/1999 | Runyon et al. ........... 242/346.1 |
| 5,893,526 | A |   | 4/1999 | Zwettler |

FOREIGN PATENT DOCUMENTS

EP          0 536 912 A2     4/1993

* cited by examiner

Primary Examiner—Craig A. Renner
(74) Attorney, Agent, or Firm—Eric D. Levinson

(57) ABSTRACT

A data storage tape cartridge (10) includes two tape guides (23, 24). The tapes guides (23, 24) have a foil (43, 143, 243) which is constructed from material which causes a wear pattern (200) to be formed in the foil (43), thereby removing localized forces and spreading out the forces and thereby decreasing the tape pressure.

6 Claims, 6 Drawing Sheets

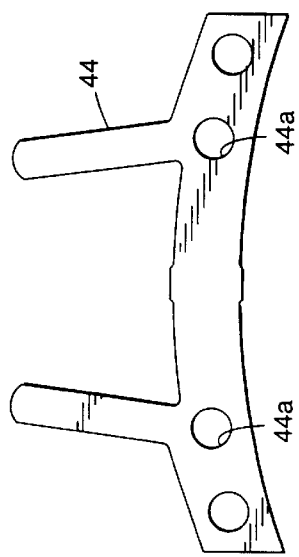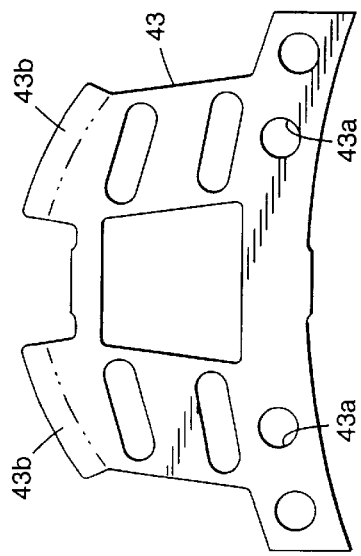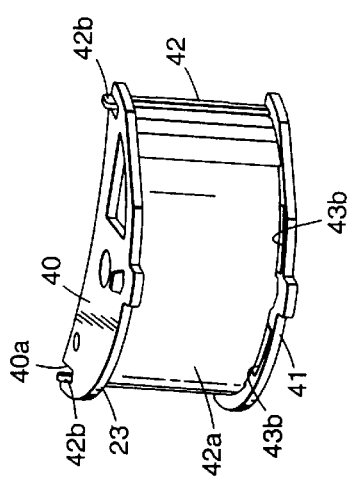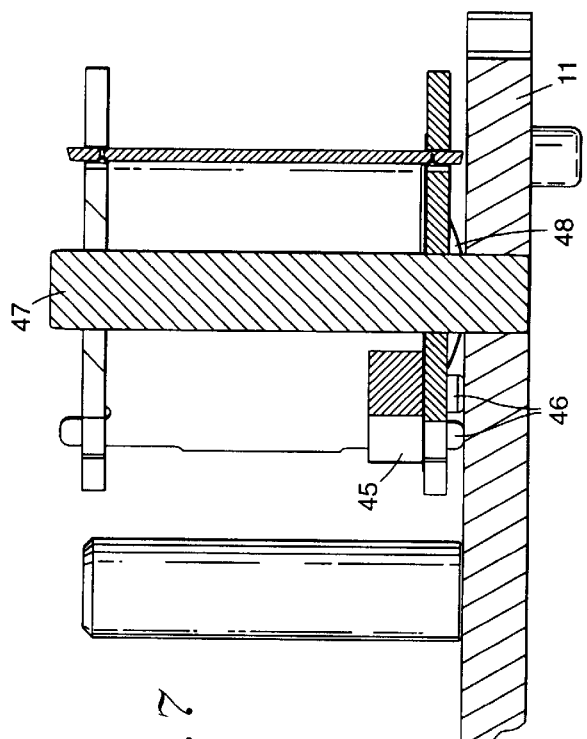

DATA STORAGE TAPE CARTRIDGE WITH GUIDE HAVING WEAR PATTERN

BACKGROUND OF THE INVENTION

This invention relates generally to a data storage tape cartridge and more particularly to a data storage tape cartridge having a compliant guide.

Cartridges have been used for decades in the computer, audio and video fields. The data storage tape cartridge continues to be an extremely popular form for recording large volumes of information for subsequent retrieval and use.

A data storage tape cartridge generally consists of an outer shell or housing maintaining at least one tape reel assembly and a length of magnetic storage tape. The storage tape is wrapped about a hub portion of a tape reel and is driven through a defined tape path by a driving system. The housing normally includes a separate cover and base, the combination of which forms an opening (or window) at a forward portion thereof for allowing access to the storage tape by a read/write head upon insertion of the data storage tape cartridge into a tape drive. This interaction between storage tape and head may take place within the housing, or the storage tape may be directed away from the housing to an adjacent area at which the read/write head is located. Where the tape cartridge/drive system is designed to direct the storage tape away from the housing, a single tape reel assembly is normally employed. Conversely, where the tape cartridge/drive system is designed to provide head/storage tape interaction within or very near the housing, a two or dual-tape reel assembly configuration is typically utilized.

The wear on the edges of the storage tape is one of the primary sources of debris in most tape magnetic media storage systems. One reason that the tape edges wear is that the load force must be high enough to constrain the tape motion at the head to specifications established by the tape drive. Reducing the guiding force allows more tape motion at the head and leads to tracking problems. Increasing the force causes excessive edge wear. One of the problems with manufacturing the guide is that the tape makes limited contact on the member that applies the force, such as a foil. This causes high pressure and accelerates the tape wear. Ideally, the force on the tape edges is spread out over a maximum area on the foil, thereby minimizing pressure on the tape. However, due to the fact that the foils are typically stamped metal parts and the tolerances that are built up in the assembly of the tape guide, it is difficult to construct an economical tape guide wherein the foil contacts the tape along its entire length.

Some foils have spring mountings so that they can move slightly when there is a force applied by the tape. However, it has been found that the foil force does not change significantly when such displacement occurs. Therefore, there is still continued wear on the tape edges. The load applying member or foil is typically constructed from stainless steel in the prior art. However, because of the economical constraints in making the foil used in the tape guides of the prior ark the foil does not contact the edge of the tape along its entire length. Instead, the tape contacts the foil at points or discrete segments. As such, the force is applied over a smaller area than possible, thereby resulting in higher pressure and therefore more tape edge wear.

Data storage tape cartridges are important tools to maintain vast amounts of information. To remain competitive, data storage tape cartridge manufacturers may continually improve cartridge performance and reliability while reducing manufacturing costs. Therefore, the need exists to manufacture a data storage tape cartridge which is effective and provides for an effective tape guide.

SUMMARY OF THE INVENTION

In one embodiment, the invention is a data storage tape cartridge having a baseplate having a head opening formed therein. A tape reel assembly is rotatably mounted on the baseplate and a storage tape is wound around the tape reel assembly. A tape guide is operably connected to the baseplate proximate the head opening. The tape guide has a bearing surface. The bearing surface has first and second edges. The tape guide also includes a load applying member, the load applying member extending from proximate one of said edges, wherein the tape is positioned over the bearing surface and an edge of the tape is in contact with the load applying member resulting in a load force applied to the load applying member. The load applying member is constructed from a material of a hardness that causes a wear pattern to be formed on the load applying member by the tape, thereby spreading the force over a larger area. The wear pattern has a depth of 0.1 microns or greater and a length that is 50 percent or greater of the load applying member over which the tape passes.

In a second embodiment, the invention is a data storage tape cartridge having a baseplate having a head opening formed therein. A tape reel assembly is rotatably mounted on the baseplate and a storage tape is wound around the tape reel assembly. The tape guide is operably connected to the baseplate proximate the head opening. A tape guide has a bearing surface. The bearing surface has first and second edges. The tape guide also includes a load applying member, the load applying member extending from proximate one of said edges, wherein the tape is positioned over the bearing surface and an edge of the tape is in contact with the load applying member resulting in a load force applied to the load applying member. The load applying member has an outer layer having a first hardness and an inner layer having a second hardness, the second hardness being greater than the first hardness.

In a third embodiment, the invention is a data storage tape cartridge having a baseplate having a head opening formed therein. A tape reel assembly is rotatably mounted on the baseplate and a storage tape is wound around the tape reel assembly. The tape guide is operably connected to the baseplate proximate the head opening. A tape guide has a bearing surface. The bearing surface has first and second edges. The tape guide also includes a load applying member, the load applying member extending from proximate one of said edges, wherein the tape is positioned over the bearing surface and an edge of the tape is in contact with the load applying member resulting in a load force applied to the load applying member. The load applying member is constructed from a multi-phase material having a first phase and a second phase, the second phase harder than the first phase.

BRIEF DESCRIPTION OF THE DRAWINGS

FIG. 6 is a perspective view of a tape guide shown in FIG. 1;

FIG. 7 is a cross sectional view of the tape guide shown in FIG. 1 taken generally along the line 7—7;

FIG. 8 is a top plan view of a spring member of the tape guide shown in FIG. 1;

FIG. 9 is a top plan view of a foil used in the tape guide shown in FIG. 1;

DETAILED DESCRIPTION OF THE PREFERRED EMBODIMENT

Figure 1:
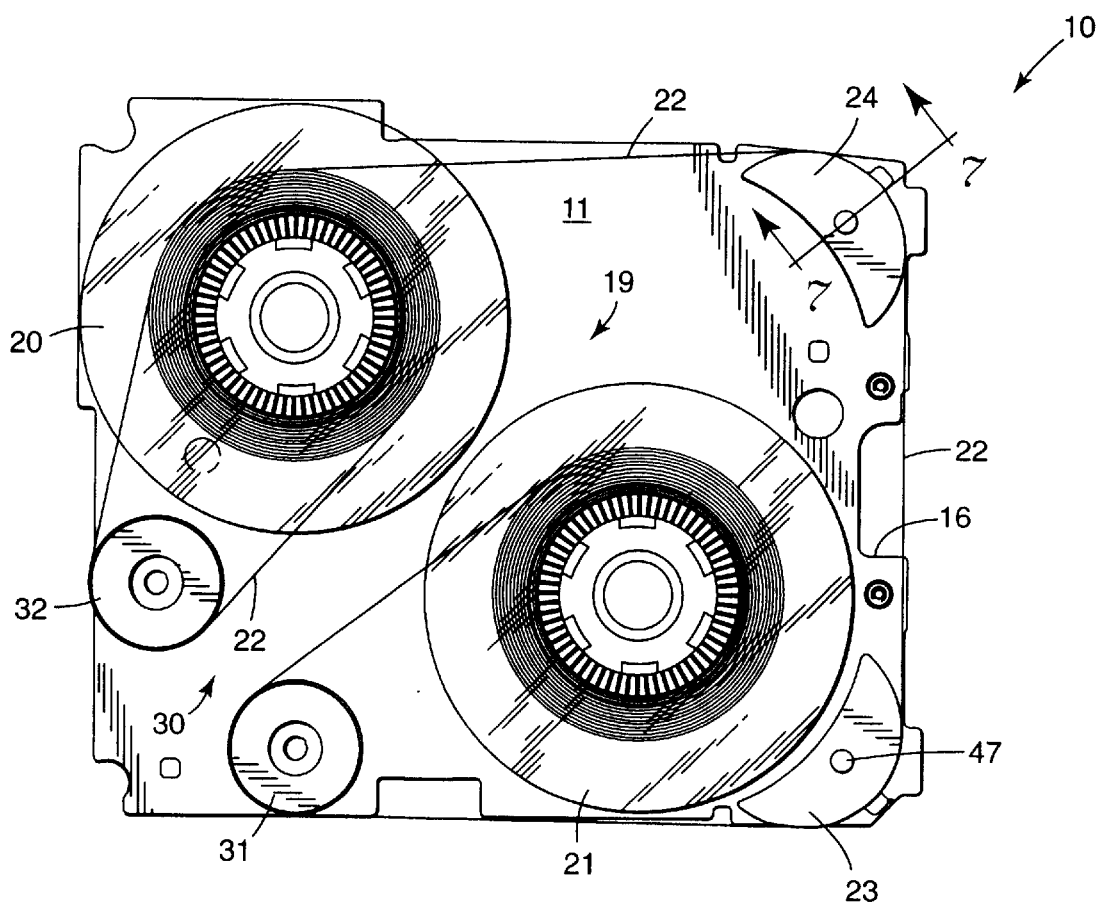
FIG. 1 is a top plan view of a baseplate and the tape path of the present invention.

Referring to the drawing, wherein like numerals represent like parts throughout the several views, there is generally shown at 10 a data storage tape cartridge tape path. The tape path 10 includes a baseplate 11 as well as other members, which will be described more fully hereafter. The baseplate 11 is a portion of a data storage tape cartridge (not shown). The data storage tape cartridge would generally include another section which, along with the baseplate 11, would form the housing for the data storage tape cartridge. The housing is sized to receive a typical tape drive (not shown). In one embodiment, the baseplate 11 would form a base and the other section would form a cover. However, it should be understood that the directional terminology, such as "cover", "base", "upper", "lower", "top", "bottom", etc. are used for purposes of illustration only and are in no way limiting.

Figure 5:
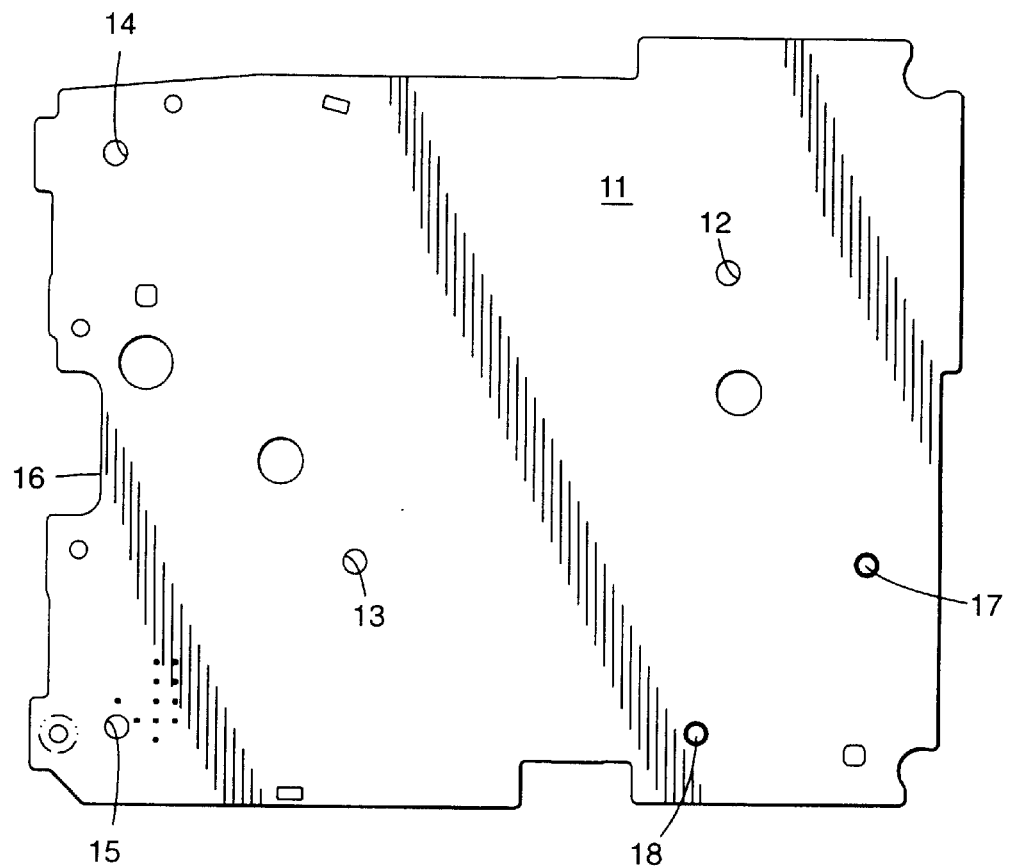
FIG. 5 is a top plan view of the baseplate shown in FIG. 1.

Referring to FIGS. 1 and 5, the baseplate 11 is generally rectangular. Tape reel mounting openings 12 and 13 are circular and are formed in the baseplate 11. Tape guide mounting openings 14 and 15 are also circular and formed in the baseplate 11. A head opening 16 is formed in the baseplate 11. A tape reel assembly 19 is rotatably mounted on the baseplate 11. The tape reel assembly 19 includes a file reel 20 and a machine spool 21 on which storage tape 22 is wound. Mounting posts (not shown) are secured in the tape reel mounting openings 12 and 13 by means well known in the art and the file reel 20 and machine spool 21 are rotatably mounted on these posts. Two tape guides 23 and 24 are operatively connected to the baseplate 11 by means well known in the art. The tape guides 23 and 24 will be described in more detail hereafter.

Figure 3:
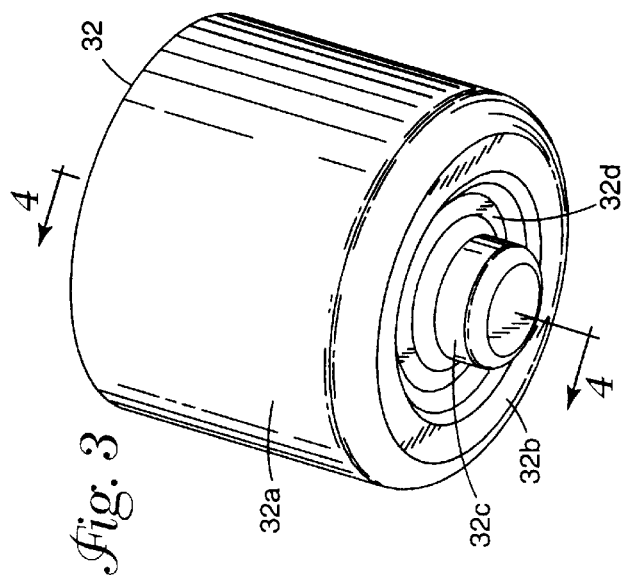
FIG. 3 is a perspective view of the bearing member shown in FIG. 2 rotated approximately 180 degrees.
Figure 2:
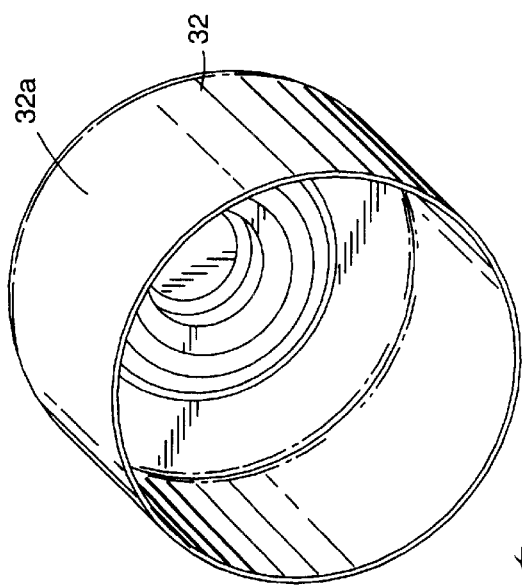
FIG. 2 is a perspective view of a bearing member shown in FIG. 1.
Figure 4:
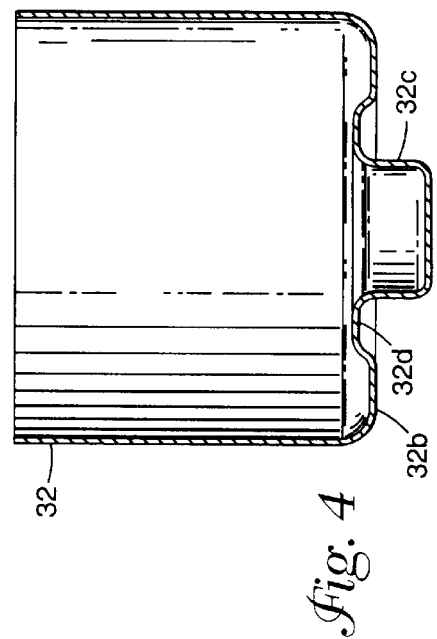
FIG. 4 is a cross-sectional view of the bearing member shown in FIG. 3 taken generally along line 4—4.

An idler bearing, generally designated at 30, includes a first bearing member 31 and second bearing member 32. The bearing members 31, 32 are identical and therefore only one will be described in detail. Two perspective views of the second bearing member 32 are shown in FIGS. 2 and 3 and a cross section is shown in FIG. 4. The metal bearing member 32 is preferably made from a deep draw process. The metal is preferably stainless steel. However, other suitable materials such as aluminum, brass or other copper alloys may be used. Further, the metals may be coated with a wear-resistant coating. The deep draw process is a well known process wherein a flat metal disc is drawn down into a cylindrical shape. The deep draw process provides for a low-cost product that is able to be manufactured rapidly. The second bearing member 32 includes a cylindrical wall 32a that has a diameter of ⅜ inch or larger, preferably ½ inch or larger and most preferably ¾ inch. The cylindrical wall 32a forms a flying guide that provides for an air bearing for the storage tape as it moves across the bearings 31, 32. The diameter is ⅜ inch or greater in order to create this air bearing. The finish on the cylindrical wall 32a is sufficiently smooth so that an air bearing is created as the tape moves over the bearings 31, 32. A preferred finish is 4 microinch RA (Roughness Average maximum). The cylindrical wall 32a has an open top at one end and a base 32b at its other end. The transition from the cylindrical wall 32a to the base 32b is in the shape of a curve to form a curved radius between the base 32b and the cylindrical wall 32a. A mounting member 32c is operatively connected to the base 32b. The cylindrical wall 32a, base 32b and mounting member 32c are preferably an integral single-piece unit formed from the deep draw process. A ring depression 32d is formed between the base 32b and the mounting member 32c. The mounting member 32c is sized and configured to be operatively connected to the baseplate 31 by a friction fit with a second bearing mounting opening 18. The mounting member 32c is shown as a cylindrical post. The length of the post 32c is substantially the same as the width of the baseplate 11. Similarly, the mounting member for the first bearing is sized and configured to have an interference fit with the first bearing mounting opening 17. As shown, the mounting member 32c has a diameter of 16 mm and the openings 17 and 18 are circular with a diameter that provides for 0.001 inch. It is understood that other suitable tolerances may be utilized to form a friction fit. Similarly, other suitable methods may also be used to secure the mounting member 32c in the bearing mounting openings 17, 18. Methods such as rivets, adhesives or other suitable methods may also be used. Further, it is understood that another idler bearing, well known in the art may be used in place of bearing members 31, 32. Such an idler bearing has two pins pressed between two curved plates and two bearing surfaces assembled as a single unit.

As can be seen in FIG. 1, the storage tape 22 is routed from the file reel 20 around the second bearing member 32. The tape then continues around the file reel 20 to the second guide 24 and past the head opening 16. The tape then continues around the first guide 23 around the first bearing member 31 and on to the machine spool 21.

The tape guides 23, 24 are similar and therefore only one will be described in detail. Details of the tape guide 23 are shown in FIGS. 6 through 9. However, it is understood that such tape guides 23, 24 are well known in the art and are available on 9840 cartridges sold by Imation Corp. The tape guide 23 includes a top member 40 operatively connected to a base member 41. A bearing 42 having a bearing surface 42a is operatively connected to the top member 40 by suitable means. One suitable method is for the bearing 42 to have a plurality of projections or tabs 42b which are positioned through openings 40a in the top member 40. A suitable friction fit may be utilized to connect the bearing 42 to the top member 40. Similarly, the base member 41 is operatively connected to the bearing 42. Prior to the assembly of the bearing 42 to the base member 41, a foil 43 and spring member 44 are operatively connected to the base member 41. A curved bar 45 is fastened to the base member 41 by suitable means such as stakes or rivets 46 which extends through openings 44a in the spring member 44 and openings 43a in the foil 43. By connecting one end of the foil 43 and spring member 44 to the base member 41, the spring member 44 extends slightly upward at its free end. The spring 44 contacts the underneath side of the foil 43 and urges the foil 43 upward. However, the foil 43 is able to be deflected downward against the force of the spring if a force is applied to the foil member 43. The tape guide 23 is secured to the baseplate 11 by a post 47 by means well known in the art. A spring washer 48 is positioned between the baseplate 11 and base member 41. The foil 43 has two projections 43b which extend beyond the bearing surface 42a when assembled. The projections 43b form the surface on which the edge of the tape 22 contacts. As can be seen, the tape guides 23, 24 provide a bearing 42 that has a bearing surface 42a between a fixed flange, or top member 40, and a compliant foil 43 on the other side. The bearing 42 has a cutout or opening through which the projections 43b of the foil 43 extend. The projections 43b are substantially perpendicular to the bearing surface 42a. The tape guides 23, 24 are positioned proximate to, and on each side of the window opening 16.

Figure 10:
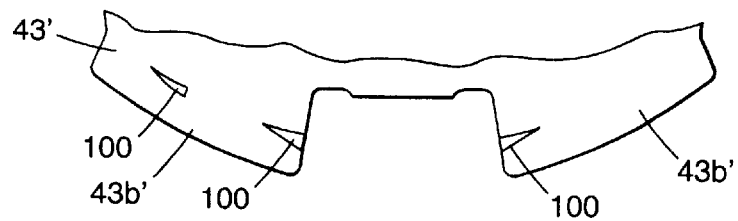
FIG. 10 is a top plan view of a portion of a prior art foil.

FIG. 10 is a top view of a portion of a foil 43' of the prior art. The view shows the projections 43b' after the tape cartridge has been in use. The foil 43' shows three wear patterns or scars 100. The foil 43' is made of stainless steel and a very small wear pattern is noted. This is because the surface is relatively hard and the edge of the tape does not scar the bearing surface.

Figure 11:
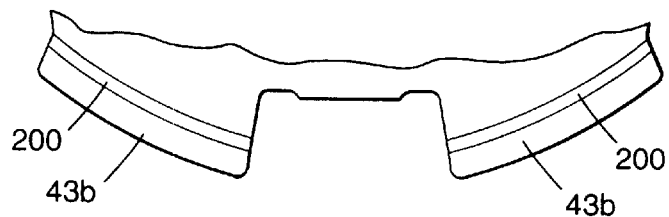
FIG. 11 is a top plan view of a portion of a foil, after use, in accordance with the present invention.

This is in contrast to the foil 43 of the present invention shown in FIG. 11. The foil 43 is made of a soft material than stainless steel such as beryllium copper, although other suitable materials may also be used. Beryllium copper has a hardness of from 80–150 kilograms/mm$^2$ on the Vickers scale. It is preferred that the hardness be 150 kilograms/mm$^2$ or less if other materials are used. This is softer than stainless steel of the prior art which has a hardness of from 300–1000 kilograms/mm$^2$ on the Vickers scale. It is preferred that the hardness be 300 kilograms/mm$^2$ or more if another material is used. Although, other hardnesses may be utilized if the desired wear pattern is still created. The edge of the tape 22 will wear into the beryllium copper surface and deform the foil 43 by forming a wear pattern and therefore spread the load force over a maximum area, thereby reducing localized pressure, with the result that the wear of the tape edge is reduced. As best seen in FIG. 11, the wear pattern 200 is the entire length of the foil 43 that comes in contact with the tape 22. The tape 22 only passes over, or has potential for contact, the projections 43b of the foil 43. While it is preferred that the length of the wear pattern 200 be the entire length of the foil projections 43b, 50 percent will also reduce the tape wear and preferably 80 percent or better for improved wear characteristics. The depth of the scar or wear pattern is preferably approximately 0.3 microns, while the depth may also be 0.2 microns or 0.1 microns, or ranges in between. A depth of at least approximately 0.1 microns is needed to spread the load force over the area and to minimize the localized points of contact that increase wear. Still further, while having a deeper wear pattern than 0.3 microns is possible, when the depth becomes much greater than 0.3 microns, a bigger groove is produced, thereby increasing the chances of a tape edge catching on the groove and causing increased wear and increased tape debris. By having a foil 43 that adjusts to the tape, there is reduced tape wear and tape debris. Another added benefit is that the foil flatness and alignment is less critical if the bearing can adjust as the cartridge is being used. The reduction in total load force has a result of better wear rate. The wear pattern shown and described is typically found after 5 to 50 percent of the tape life and preferably after about 10 percent of the tape life.

Figure 12:
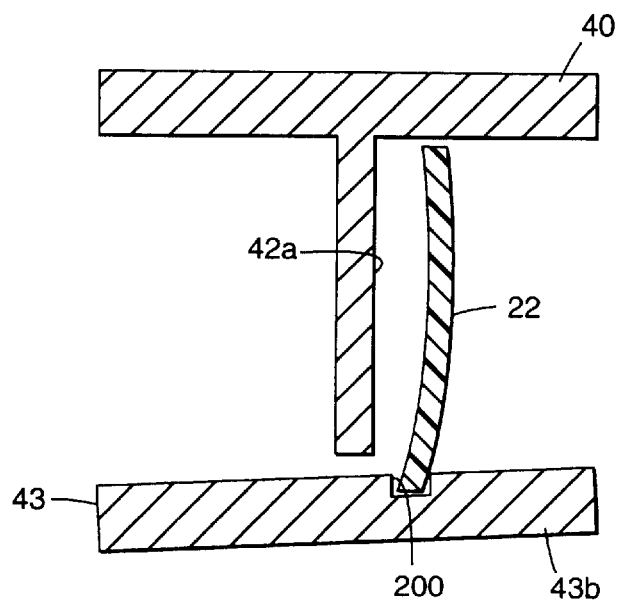
FIG. 12 is a schematic side representation of the foil of the present invention.

FIG. 12 is a schematic representation of a cross-sectional view of the present invention. The figure shows the tape 22 having created the wear pattern 200 in the foil 43. An air bearing is shown by the spacing of the tape 22 from the bearing surface 42a. However proximate the bottom of the bearing surface 42a where there are cutouts for the foil 43, the air bearing collapses slightly. The wear pattern 200 allows for a more even distribution of the forces from the tape edge 22 and redistributes the force along a greater length of the foil 43, thereby reducing the pressure, and thereby decreasing tape wear and tape debris.

Figure 13:
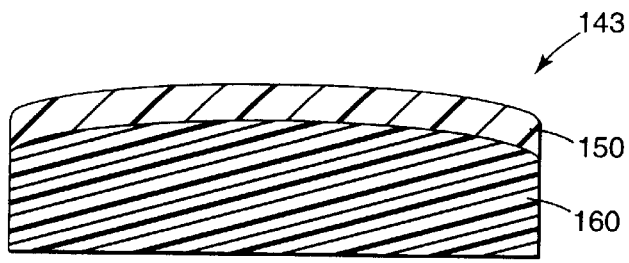
FIG. 13 is a cross sectional view of a second embodiment of a portion of a foil of the present invention.
Figure 14:
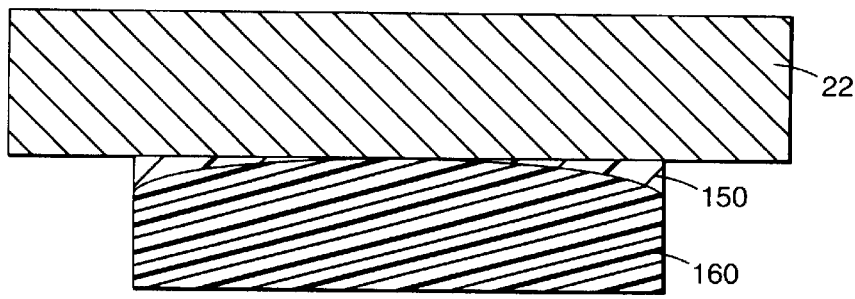
FIG. 14 is a side view of the embodiment shown in FIG. 13 with a magnetic tape in position after use.

The second embodiment of the present invention is shown in FIGS. 13 and 14. The embodiment shown in FIGS. 1 through 12 is advantageous for reducing the wear rate and tape debris. However, if the material is too soft, the tape will cut too deeply into the foil and if the wear rate is too low (the material is too hard), the tape wears and not the foil. The second and third embodiments of the present invention adjust the hardness to optimize the load distribution and minimize the wear on the tape edges. The second embodiment shows a foil 143 in cross-section. The foil 143 is a multi-layer foil. The first layer 150 is constructed from a softer material such as beryllium copper and the second layer 160 is constructed from a harder material such as stainless steel. The multilayer foil 143 may be slightly bowed, as shown in the figure. The two layers are operatively connected by means well known in the art.

FIG. 14 shows a tape that has run on to the foil and has cut through the soft layer 150 and created a wear pattern similar to the first embodiment. Such a cut will occur within 5 to 50 percent of the length of the tape life. It is preferable that that time would be approximately 10 percent of the tape life. When the tape 22 reaches the hard layer 160, the wear rate slows. It has been found that there is slight wear event 200 percent of the tape life. It is understood that other suitable combinations of material for the multilayer film may be used such as aluminum and steel or copper and steel. It is preferred that the thickness of the first layer 150 is between 0.1 to 0.5 microns, to allow for the creation of wear pattern of the same depth and characteristics as discussed in the first embodiment.

Figure 15:
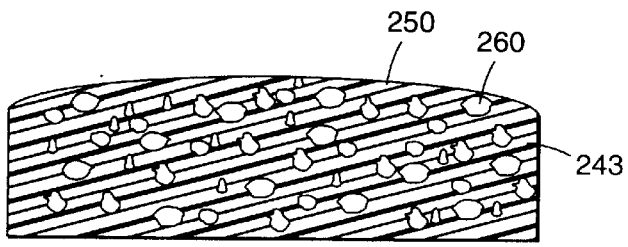
FIG. 15 is a cross sectional view of a third embodiment of the foil of the present invention.
Figure 16:
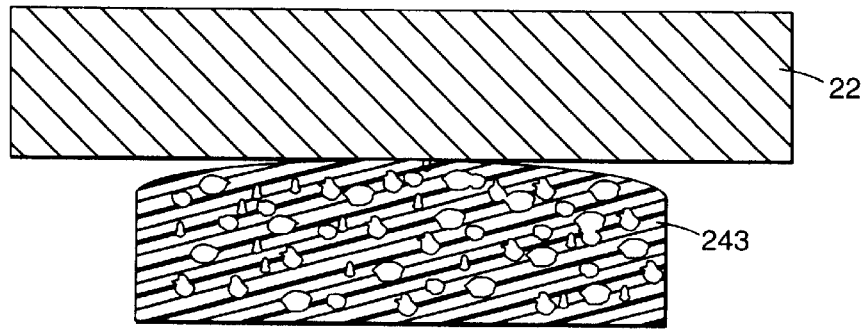
FIG. 16 is a cross sectional view of the third embodiment shown in FIG. 15 with a magnetic tape in position after use.

FIGS. 15 and 16 show still another embodiment of the present invention. The foil 243 is a multi-layered foil. The foil 243 has both hard phases 260 and soft phases 250 in a material matrix. The relative concentrations may be adjusted to control wear rates. One example of such a material would be SiC in aluminum, $Al_2O_3$ in aluminum or $Al_2O_3$ hard phase in a polycarbonate matrix. FIG. 16 shows how the tape, after similar running times as described with respect to FIGS. 13 and 14, cuts through the soft material 250 until it reaches the hard phase 260, and creates a wear pattern similar to the first embodiment. At this time, the pressure from the tape is being reduced as it is being spread out over a larger area and the reduced pressure stops further wear.

What is claimed is:

1. A data storage tape cartridge, comprising:

a) a baseplate having a head opening formed therein;

b) a tape reel assembly rotatably mounted on the baseplate, a storage tape wound around the tape reel assembly;

c) a tape guide operatively connected to the baseplate proximate the head opening;
d) the tape guide having a bearing surface, having first and second edges, and a load applying member, the load applying member extending from proximate one of said edges, wherein the tape is positioned over the bearing surface and an edge of the tape is in contact with the load applying member resulting in a load force applied to the load applying member; and
e) the load applying member constructed from a material of a hardness that causes a wear pattern to be formed on the load applying member by the tape thereby spreading the load force over a larger area, the wear pattern has a depth of 0.1 microns or greater and a length that is 50 percent or greater of the load applying member over which the tape passes.

2. The data storage tape cartridge of claim 1, wherein the wear pattern is formed within 5 to 50 percent of the tape's life.

3. The data storage tape cartridge of claim 2, wherein the wear pattern has a depth of 0.2 microns or greater and a length that is 80 percent or greater of the bearing surface's length.

4. The data storage cartridge of claim 3, wherein the wear pattern has a depth of 0.3 microns or greater and a length that is equal to the length of the bearing surface's length.

5. The data storage cartridge of claim 1, wherein the load applying member has a hardness of 150 kilograms/mm$^2$ or less on a Vickers scale.

6. The data storage cartridge of claim 5, wherein the load applying member is beryllium copper.

* * * * *